Patented Nov. 22, 1927.

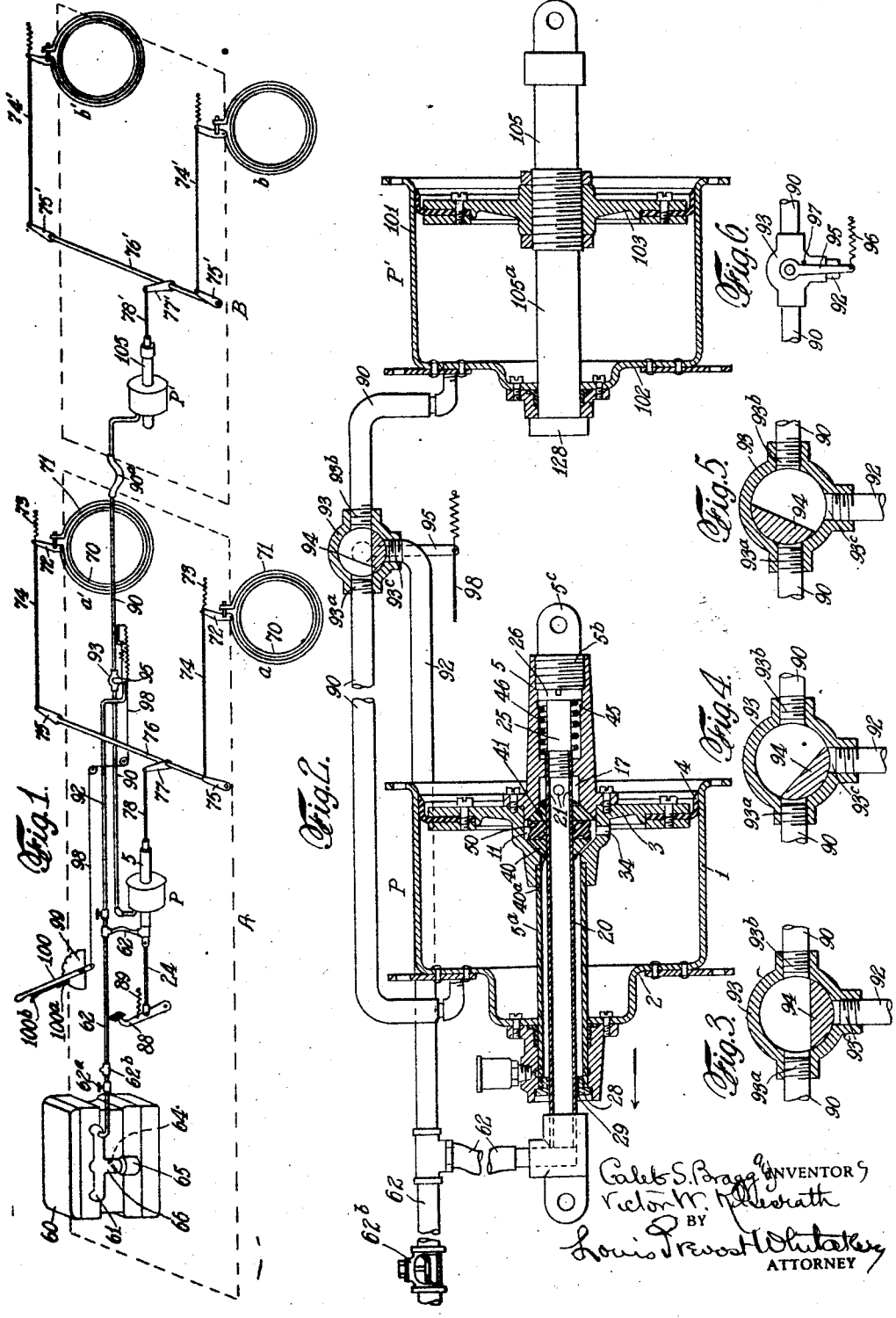

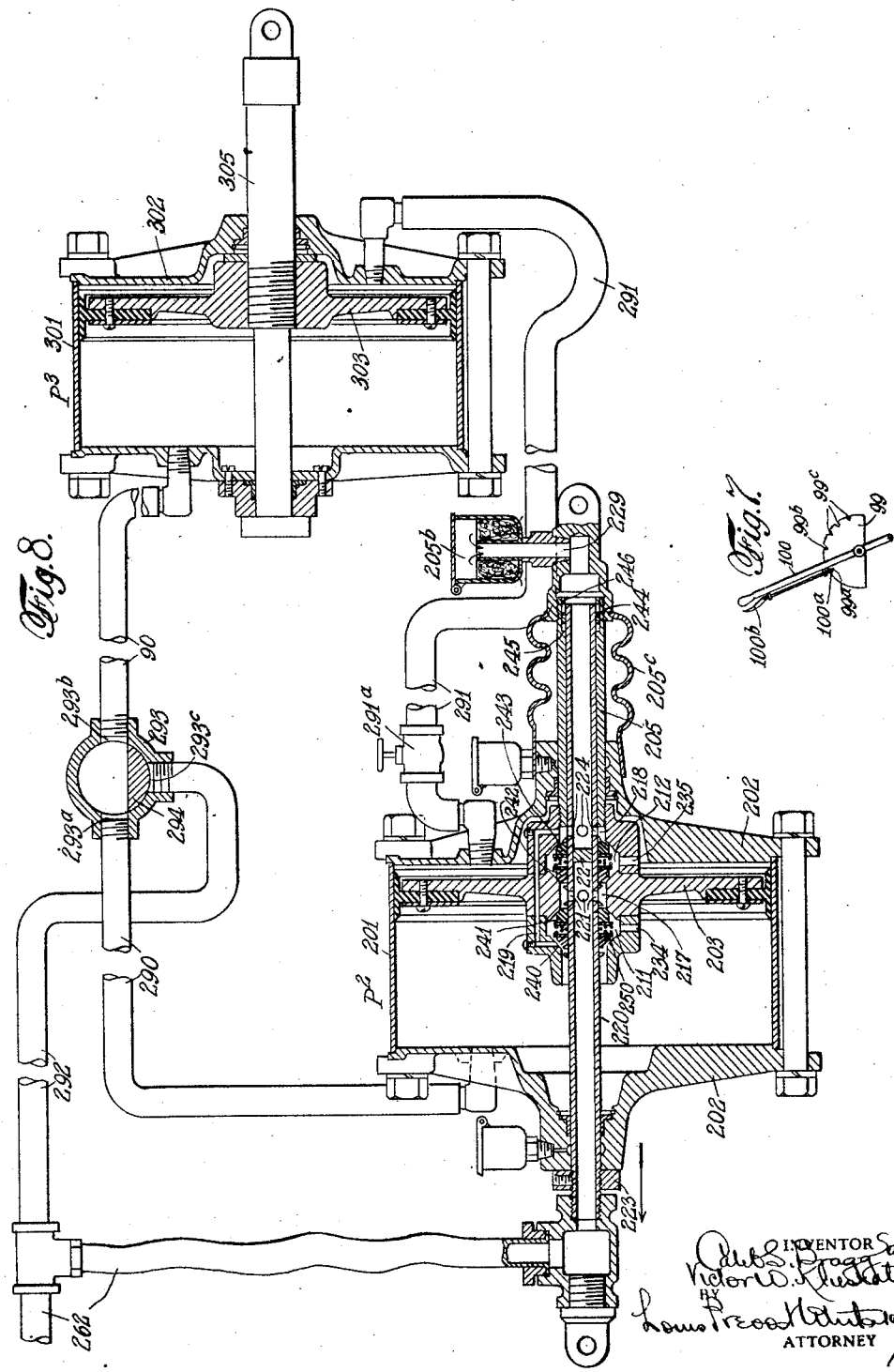

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

BRAKE MECHANISM FOR AUTOMOTIVE VEHICLES.

Application filed January 25, 1927. Serial No. 163,348.

Our invention consists in the novel features hereinafter described, reference being had to the accompanying drawings which show several forms in which we have contemplated embodying our invention, and the said invention is fully disclosed in the following description and claims.

Our invention is an improvement in brake mechanism for automotive vehicles, and is adapted particularly to installations in which a main power actuator provided with controlling valve mechanism and operated by differential pressures, preferably rarefication or suction, obtained by connection with the intake manifold of the internal combustion engine which propels the vehicle, and air at atmospheric pressure, is employed to operate the brake mechanism of a main automotive vehicle, which also propels a trailer or trailers provided with separate brake mechanisms operated by an auxiliary power actuator capable of being controlled by the valve mechanism of the main power actuator carried by the main vehicle, through suitable tubular connections for the purpose of substantially simultaneously applying the brakes of the main vehicle and trailer or trailers. In installations of this kind, our experience has shown that it is desirable to do as much of the braking as possible on the wheels of the trailer, when heavily laden trailers are being drawn in order to prevent what is termed "jack-knifing". If the application of the brakes simultaneously to a main automotive vehicle, which we will herein term the "tractor", and a trailer has the effect of slowing down the tractor more rapidly than the trailer, as where the trailer is very heavily laden, the trailer will run up on the tractor until arrested thereby, and the push of the trailer against the rear end of the tractor frequently causes the tractor to skid, that is, its rear wheels slip sideways on the roadway, which naturally directs the trailer toward the side of the road in the same direction and produces what is termed "jack-knifing".

Another serious difficulty with the use of power brakes on tractor and trailer is that if the brakes are sufficiently powerful to hold the trailer when fully loaded, they will act too powerfully when the trailer is carrying a light load or none at all, as the trailer itself is usually much lighter than the tractor, and frequently weighs less than 25% of the load which it is capable of carrying, while the weight of the tractor is generally equal to and in many cases greater than its normal load, therefore, if the power brakes on the trailer and tractor are adequate to stop them when fully loaded, if both brakes are applied when both the tractor and trailer are empty with sufficient power to make a normal stop of the tractor, the wheels of the trailer will skid, and the rear end of the trailer may swing sideways with respect to the roadway. In either of the cases before mentioned an accident is liable, and on wet pavements almost inevitable.

Our present invention has for its object to provide in connection with a main power actuator located on the propelling vehicle or tractor and connected with the brake mechanism therefor, and an auxiliary power actuator located on the trailing vehicle and connected with the brake mechanism therefor, means for normally maintaining the pistons of said main and auxiliary actuators submerged in air at atmospheric pressure, that is to say, subjected on both sides to atmospheric pressure, and to provide for the simultaneous operation of both actuators, the piston of either of which may be single or double acting, under the control of the operator operated valve mechanism of the main actuator, and also to provide for disconnecting said actuators to permit of the separate operation of the main actuator under the control of its valve mechanism, or the separate operation of the auxiliary actuator under the control of separate and independent operator operated valve mechanism. This result is conveniently accomplished in the embodiments of our invention herein shown and described, by providing an auxiliary valve mechanism for the auxiliary actuator, whereby the main and auxiliary actuators may be operatively coupled for joint operation, or disconnected, and while disconnected the auxiliary actuator may be connected to the source of suction independently of the connection of the main actuator therewith, said auxiliary valve mechanism being conveniently located in a connecting pipe between the main and auxiliary actuator cylinders forward of the piston therein.

Our invention also comprises the novel features of construction and combination of parts hereinafter fully described and particularly pointed out in the claims.

Referring to the accompanying drawings,

Fig. 1 is a diagrammatic view representing an installation of our improved brake mechanism in a main automotive vehicle or tractor, and a trailing vehicle.

Fig. 2 is an enlarged detail sectional view of the main valve controlled actuator and the auxiliary valveless actuator, and their connections with each other and with the intake manifold and with the atmosphere, including the auxiliary valve mechanism, both pistons being normally submerged in atmospheric air when in retracted position.

Figs. 3, 4 and 5 are detail sectional views showing the auxiliary valve mechanism in three different positions.

Fig. 6 is a side elevation of the auxiliary valve mechanism showing a stop for arresting the valve in its retracted position.

Fig. 7 is a detail view of one means for locking the auxiliary valve mechanism in its intermediate position.

Fig. 8 is a view similar to Fig. 2, showing a slightly modified arrangement, in which the actuator pistons are double acting.

Referring to Fig. 1 of the drawings, A, represents a main automotive vehicle, diagrammatically indicated by dotted lines, which may be for example a motor truck, or the like, and will be hereinafter referred to as the tractor. B indicates a trailing vehicle having two or more wheels, the trailer being also indicated diagrammatically by dotted lines. The tractor is provided with an internal combustion engine indicated at 60, for propelling both vehicles, which will be coupled together in any usual or preferred manner. The engine is provided with the usual intake manifold, indicated at 61, suction passage, 66, carburetor, 65, and throttle valve, 64. The tractor is also provided with suitable brake mechanism which may be of any desired type, and arranged to apply the brakes to two or more wheels. For purposes of illustration we have shown in the diagram, Fig. 1, a diagrammatic representation of the brake mechanisms for the rear wheels of the tractor indicated at $a$, $a^1$, each of which comprises in this instance a brake drum, 70, brake band, 71, brake operating lever, 72, and retracting spring indicated at 73, the brake levers, 72, being each connected by a link, 74, with the arm, 75, on a common rock shaft, 76, provided with an operating arm, 77, adapted to be operated by the main or master power actuator indicated as a whole at P under the control of its valve mechanism which is operated by a foot lever, 88, or other operator operated part provided with the usual retracting spring, 89. Means are provided whereby the piston of the main or master actuator and brake mechanism connected therewith, may have applied to them the physical force of the operator through the lever, 88, in addition to the power of the actuator, P, or for the purpose of operating the brakes of the tractor entirely by the physical force of the operator in case of failure of power for any reason. The trailer, B, is also provided with independently operated brake mechanism of any usual or desired type for two or more of its wheels, and in this instance for purposes of illustration we have shown the trailer provided with two brake mechanisms illustrated at $b$, $b^1$, each of which is shown as being in the same form as the brake mechanism illustrated in connection with the tractor, and given the same reference characters. The brake levers of the brake mechanisms, $b$ and $b^1$, are shown in this instance as connected by links, $74^1$, with arms, $75^1$, on a rock shaft, $76^1$, having an operating arm, $77^1$, operatively connected with an auxiliary power actuator mounted on the trailer and indicated at $P^1$, and being in this instance a valveless actuator operatively connected with the main or master power actuator, P, and controlled by the valve mechanism of the latter, through suitable pipe connections hereinafter described.

The main or master power actuator, P, as shown in Fig. 2, is of the kind described in our previous Letters Patent of the United States, No. 1,582,118, dated April 27, 1926. It comprises a cylinder, 1, which is open at one end to the atmosphere and closed at the other end by a head, 2. 3, represents a piston located in the cylinder, and provided with a gasket, 4. Within the piston hub is a valve chamber, indicated at 11, which communicates by one or more passages, 34, with the enclosed chamber formed within the cylinder, forward of the piston, that is to say, between the piston and the head, 2. The piston, 3, is also provided with a hollow piston rod indicated at $5^a$, extending through the head, 2, which is provided with a sleeve containing a suitable stuffing box or other packing means. The outer end of the piston rod is preferably provided with a projecting collar, 28, adapted to engage a shoulder on the sleeve of the cylinder head to limit the movement of the piston in a direction away from said head, and the outer end of the piston rod is also provided with suitable air inlet apertures to connect it with the atmosphere, formed in this instance in the collar, 28, and indicated at 29. The piston, 3, is also provided on the opposite side of the piston from the piston rod, $5^a$, with a hub extension, 5, the outer end of which is provided with means for attaching it to the brake mechanism of the tractor. In this instance, the said hub extension, which is also hollow, is provided at its outer end with a screw plug, $5^b$, carrying an ear, $5^c$, to facilitate its connection with brake mechanism.

Within the valve chamber are two oppositely disposed valves, 40 and 41, of which 40 is an air inlet valve, and 41 a suction valve, said valves being normally pressed toward their seats by an intermediate yielding cushioning device, 50. 20, represents a valve actuating sleeve extending through the valve and provided with collars on opposite sides of the valve indicated at 40ª and 41ª, so that a movement of the sleeve in either direction will tend to open one or the other of said valves. The valves themselves are preferably made of molded rubber or other suitable material or composition, and provided with central apertures fitting the sleeve, 20, sufficiently tight to make an air tight joint and seal said apertures, while permitting the movement of the sleeve therethrough. The piston hub is also provided with a suction chamber, indicated at 17, which communicates at the end of the valve chamber, 11, opposite the piston rod, 5ª, said suction chamber communicating with the interior of the sleeve, 20, by means of suitable apertures, 21, and the outer end of the sleeve which extends through the collar, 28, of the piston rod, 5ª, is provided with means for connecting it with the intake manifold of the engine, as the suction pipe, 62, the portion of which adjacent to the sleeve is flexible to permit of the longitudinal movements of the sleeve. The sleeve, 20, is also provided with an ear or lug for connecting it with the pedal lever by means of a link, 24. In this instance, the extension, 5, of the piston, 3, is connected by a link, 78, with the operating arm, 77, of the tractor brake mechanism.

The valve actuating sleeve, 20, is provided at its inner end with a plug, 25, having an enlarged head, 26, engaging a recess in the interior of the piston hub extension, 5, between a shoulder, 45, and the plug, 5ᶜ, thereby providing a limited amount of lost motion between the sleeve, 20, and the piston, 3, sufficient to insure the operation of the valve mechanism for the actuator, and as soon as this lost motion is taken up it will be seen that the physical force of the operator can be exerted directly on the piston, and through the piston upon the brake mechanism connected therewith, so as to enable the operator to add his physical force to that of the actuator, and also to apply the brake mechanism of the tractor by physical force alone in case of failure of power. In this instance, we have also shown a retracting spring, 46, surrounding the plug, 25, and interposed between the enlarged head of the plug and a shoulder at the inner end of a recess within the hub extension, 5, which spring normally tends to force the valve actuating sleeve, 20, in a direction opposite to that indicated by the arrow in Fig. 2, and to bring the head of the plug, 26, into engagement with the plug, 5ᵇ, in the outer end of the hub extension 5. The collar, 40ª, which engages the face of the air inlet valve, 40, is so located that when the sleeve is retracted by the spring, 46, to its fullest extent, the collar, 40ª, will hold the air inlet valve, 40, open, thus establishing communication between the cylinder forward of the piston and the atmosphere, and as the opposite face of the piston is always exposed to the atmosphere, the pressures on opposite faces of the piston will be equalized, and the piston submerged in air at atmospheric pressure, and when the parts are in the position just described, and the spring, 46, will normally maintain the air inlet valve 40, open, and the suction valve, 41, closed, and the piston submerged in air at atmospheric pressure when the piston is in retracted position, as shown in Fig. 2. The spring, 46, may be used in addition to the retracting spring of the foot lever or in lieu thereof, as preferred.

The auxiliary actuator, P¹, mounted on the trailer comprises, in this instance, a cylinder, 101, open at its rear end to the atmosphere, and closed at its forward end by a head, 102, and provided with a single acting piston, 103, having a piston rod, 105ª, guided in a stuffing box in the cylinder head and provided with a stop, 128, to engage the end of the stuffing box and arrest the piston in its retracted position. The piston, 103, is also provided with a hub extension, 105, which is connected to the brake mechanism of the trailer, for example, by a link, 78¹, extending therefrom to the operating arm, 77¹, as shown in Fig. 1, or in any other desired manner.

The portions of the cylinder, 1 and 101, forward of the pistons therein, are connected by a pipe, 90, which extends from the tractor to the trailer, and may be conveniently provided with a flexible portion, 90ª, between the vehicles in a well known manner to accommodate the relative movements of the vehicle. In this pipe, 90, and preferably on the tractor vehicle, we have shown in Figs. 1 and 2, an auxiliary controlling valve mechanism consisting in the present instance of a three way valve comprising a valve casing, 93, provided with oppositely disposed cylinder ports, 93ª and 93ᵇ, connected by portions of the pipe, 90, with the cylinders, 1 and 101, respectively, and having a laterally disposed suction port, 93ᶜ, communicating by a pipe, 92, with the intake manifold or other source of suction, and being in this instance connected with the main suction pipe, 62. Within the valve casing, 93, is a valve, 94, in this instance mounted to rotate in the casing and capable of being moved into the three positions indicated in Figs. 3, 4 and 5. In the normal position of the valve shown in Figs. 2 and 3, the suction port, 93ᶜ, is closed, and the valve provides a free passage between the opposite cylinder ports, 93ᵃ and 93ᵇ, and permits both actuators to be operated substantially simultaneously under the control of the valve mechanism of the main or master actuator, to simultaneously apply the brakes of the tractor and trailer. By rotating the valve, 94, in a clockwise direction into the intermediate position indicated in Fig. 4, the suction port, 93ᶜ, still remains closed, and the port, 93ᵃ, communicating with the main actuator cylinder is also closed. This has the effect of separating the two cylinders from each other, and when the valve, 94, is in this intermediate position, the operation of the controlling valve mechanism of the main actuator would produce the operation of the main actuator only, and the brakes of the tractor connected therewith, without any accompanying operation of the auxiliary actuator and trailer brakes. By further moving the valve, 94, in a clockwise direction, as indicated in Fig. 5, the suction port, 93ᶜ, may be placed in communication to a greater or less extent with the port, 93ᵇ, communicating with the auxiliary actuator cylinder forward of the piston therein, the port, 93ᵃ, communicating with the main actuator cylinder remaining closed. This position of the valve connects the auxiliary actuator cylinder forward of the piston with the intake manifold or other source of suction, and withdraws the air from said portion of the cylinder, the said cylinder in rear of the piston being in communication with the atmosphere, and the auxiliary piston, 103, will move forward to apply the brakes of the trailer independently of the main actuator.

We provide independent operator operated means within the reach of the driver for operating the auxiliary controlling valve mechanism independently of the foot lever, 88, which controls the valve mechanism of the main actuator. In this instance, we have shown the valve, 94, provided with an operating arm, 95, having a retracting spring, 96, for holding the valve in its normal position, for example, by holding the arm, 95, against a stop, 97, as indicated in Fig. 6, or in any other desired manner. In this instance, we have shown a pivoted hand lever, 100, adjacent to the driver's seat, operatively connected with the valve actuating arm, 95, as by a cable, 98, said lever being provided with a segment, 99, and the usual locking pawl, 100ᵃ, and releasing lever, 100ᵇ, therefor, indicated in detail in Fig. 7. The segment, 99, may be conveniently provided with a locking notch, 99ᵃ, holding the lever in normal position, and locking notch, 99ᵇ, adapted to hold the lever and the valve, 94, in its intermediate position, and a plurality of notches, 99ᶜ, for holding the valve, 94, in position to open the suction port, 93ᶜ, more or less, and place it in communication with the auxiliary actuator cylinder. Any other suitable actuating means may, however, be employed.

Assuming that the engine is running with the throttle closed or partially closed so that rarefication exists in the intake manifold or suction passage with which the suction pipe, 62, is connected, and the auxiliary valve, 94, being in its normal or retracted position, the brake mechanisms of the tractor and trailer may be substantially simultaneously and equally applied by the operator by placing his foot on the lever, 88, and moving it forward. This will move the valve actuating sleeve, 20, in the direction of the arrow in Fig. 2, closing the air inlet valve, 40, shutting off the main actuator cylinder from its connection with the atmosphere, and opening the suction valve, 41, so as to connect the said portion of the cylinder, 1, in communication with the suction pipe, 62, and substantially simultaneously placing the auxiliary actuator cylinder, 101, forward of the piston in communication with the suction pipe by means of the connecting pipe, 90. The air will, therefore, be exhausted from both main and auxiliary actuator cylinders on the forward sides of the pistons therein, and as the opposite faces of said pistons are exposed to atmospheric pressure, both pistons will move forward simultaneously to apply the brakes of both vehicles with equal pressure so long as the forward movement of the foot lever continues. As soon as the forward movement of the foot lever stops, a slight forward movement of the main actuator piston with respect to the valve actuating sleeve, 20, will permit the suction valve, 41, to close and hold the brakes applied. A slight release of the foot lever will permit a further rearward movement of the sleeve, 20, with respect to the piston to partially open the air inlet valve, 40, decreasing the degree of rarefication in both actuator cylinders and permitting the brake mechanisms of both vehicles to relieve themselves by the draft of the brakes and their retracting springs, and the brakes can be reapplied by a forward movement of the pedal lever and valve sleeve to again close the air inlet valve and open the suction valve, and this can be done as often as desired, as in continuous braking on a long grade or in traffic. It will be seen that when the brakes are fully applied, the operator may add his physical force to the tractor brake mechanism in addition to the actuator by pressing the lever, 88, forward far enough to take up the lost motion between the sleeve, 20, and the piston, 3, by bringing the head of the plug, 26, into engagement with the shoulder, 45, after which his physical force will be exerted on the piston, 3, and through the piston transmitted to the tractor brake mechanism. It will also be seen that by taking up this lost motion, the operator may actuate the piston, 3, and the tractor brake mechanism by physical force alone in case of failure of power, as the first movement of the sleeve, 20, effecting the opening of the suction valve, 41, will vent the cylinder, 1, forward of the piston, 3. When it is desired to release the brake mechanisms of both vehicles, the operator will remove his foot from the brake lever with the result that the sleeve, 20, will be instantly shifted by spring, 46, in a direction opposite that indicated by the arrow in Fig. 2, until arrested by the plug, 26, engaging the plug, 5$^b$, thus closing the suction valve, 41, and opening the air inlet valve, and permitting a complete equalization of pressures on opposite sides of the pistons of both actuators, said pistons being returned to their normal positions by the draft of the brakes and their retracting springs. The parts will return to the position indicated in Fig. 2, the air inlet valve, 40, remaining open, and thus maintaining both pistons normally submerged in air at atmospheric pressure, as before stated.

The suction pipe is shown provided with an adjustable restricting valve, 62$^a$, which we prefer to employ, to regulate the rapidity with which air withdrawn from the actuators may be delivered into the intake manifold, for the purpose of preventing the stalling of the engine if idling or interfering materially with its operation. The suction pipe, 62, is also shown provided with a check valve, 62$^b$, which in this installation, is effective in preventing explosive mixture from being drawn into the suction pipe and condensing, which might result in injury to the main actuator either by an explosion due to a backfire, or by permitting condensed motor fuel to find its way into the actuator, which would be likely to injure the valves and packings.

When it is desired to operate the tractor brakes alone, the auxiliary valve, 94, will be turned to the intermediate position, indicated in Fig. 4, and locked, closing the cylinder port, 93$^a$, and while in this position the foot lever may be operated to effect the operation of the tractor brakes by means of the main power actuator, P, in the manner hereinbefore described, without operating the auxiliary actuator or the trailer connected therewith. If it is desired to operate the trailer brakes without operating the tractor brakes, the operator will move the auxiliary valve mechanism into position to connect the suction pipe, 92, with the auxiliary actuator cylinder, 101, while maintaining the cylinder port, 93$^a$, closed, the position of the valve being indicated in Fig. 5, thus connecting the auxiliary actuator to the intake manifold, and exhausting the air on the forward side of the auxiliary actuator piston, 103, and applying only the trailer brakes. When it is desired to release the trailer brakes, the auxiliary valve, 94, will be returned to normal position, closing the port, 93$^c$, and reestablishing communication between the two cylinders to the pipe, 90. As the cylinder, 1, forward of the piston is in communication with the atmosphere through the open air inlet valve, 40, air will pass through the pipe, 90, to the auxiliary actuator cylinder, and permit the auxiliary actuator piston, 103, to be returned to its normal position by the draft of the trailer brakes and their usual retracting springs, leaving both cylinders filled with air at atmospheric pressure. In some instances, it may be desirable to use the tractor without the trailer, and this may be conveniently accomplished by locking the auxiliary controlling valve mechanism in its intermediate position. As soon as this is done, the trailer may be disconnected from the tractor, the flexible portion of pipe, 90, removed, and the tractor brakes may be applied as before described, under the control of the foot lever, 88. We do not limit ourselves to the use of the particular form of auxiliary valve mechanism herein shown and described, i. e., a three way rotary valve, as other forms of valves may be employed to carry our invention into effect, and any other suitable form of operator operated means for the auxiliary valve mechanism for operating it independently of the foot lever or other operator operated means for the main actuator valve mechanism, may be employed.

Our invention is equally applicable to brake mechanism for tractor and trailer, in which the main actuator or the main and auxiliary actuators are provided with double acting pistons. As illustrative of this, we have shown in Fig. 8 an installation similar to that shown in Fig. 2, in which the main actuator, the details of which form no part of the present invention, is of the type covered by our former application for Letters Patent of the United States, Serial No. 63,697, filed October 20, 1925. The specific construction of this actuator and its valve mechanism form no part of the present invention, and will only be referred to sufficiently to enable our present invention to be understood. In this figure the parts corresponding with those shown in Fig. 2 are represented by the same numerals, with the addition of 200. P$^2$, represents the main actuator, the piston of which is double acting, the piston hub being provided with two valve chambers, 211 and 212, and four valves arranged in pairs within said chambers, the valves, 240 and 243, being the air inlet valves controlling the admission of air on opposite sides of the pistons through the inlet aperture, 229, in the piston rod, 205, by means of apertures, 224, communicating with an air inlet chamber, 218, on one side of the piston adjacent to the valve, 243, and a by-pass, 219, extending through the hub to the inlet valve, 240. The valve actuating collars are so set that when the piston is in retracted position, a stop collar, 223, on the sleeve, 220, will hold the air inlet valves, 240 and 243 open, and the suction valves, 241 and 242 closed. The main actuator cylinder is therefore connected with the atmosphere on both sides of the piston when the latter is in retracted position, and the piston is submerged in air at atmospheric pressure. The cylinder, 201, of the main actuator is, of course, closed at both ends, and is connected forward of the piston by a pipe, 290, with the cylinder, 301, of the auxiliary actuator, P³, forward of the piston therein. The auxiliary actuator cylinder is also closed at both ends, and said cylinders in rear of their respective pistons are connected by a pipe, 291, as shown, in which is preferably located a cut-off valve, 291ª, which may be closed when the trailer is detached from the tractor, to enable the brakes of the tractor to be operated by moving the auxiliary valve to its intermediate position. The pipe, 291, insures that the auxiliary actuator piston shall also be submerged in air at atmospheric pressure when the main actuator piston is in retracted position, and renders the auxiliary actuator also double acting when the auxiliary valve mechanism is in its normal position. The auxiliary valve is located in the pipe, 290, and is constructed and connected, and operates exactly in the manner hereinbefore described. The only difference is that when the valve is in the neutral position shown in Fig. 8, the main actuator which is controlled by the ordinary foot pedal connected with its valve actuating sleeve, 220, will operate both actuator pistons substantially simultaneously and with the same pressure in both directions, that is, to apply and release the brake mechanism of the tractor connected with the main actuator piston, and the brake mechanism of the trailer connected with the auxiliary actuator piston.

What we claim and desire to secure by Letters Patent is:—

1. The combination with a main and auxiliary power actuator, each comprising a cylinder and a piston therein provided with means for connecting it with a part to be operated, controlling valve mechanism for the main actuator, means for connecting the main actuator cylinder with a source of suction and with a source of higher pressure fluid under the control of said valve mechanism, means for holding the valve mechanism in position to normally maintain said piston submerged in air at atmospheric pressure when in retracted position, tubular connections extending between said actuators forward of their pistons to permit said valve mechanism to effect the joint operation of both actuators, and a main operator operated part connected with said controlling valve mechanism, of an auxiliary controlling valve mechanism located in a tubular connection between said actuators and constructed to normally maintain them connected for joint operation in one position of said auxiliary controlling valve mechanism, and to disconnect them in another position of said auxiliary valve mechanism to permit the independent operation of the main actuator under the control of its valve mechanism, and in a third position of the auxiliary valve mechanism to effect the operation of the auxiliary actuator without operating the main actuator, means for connecting the auxiliary actuator in rear of its piston with the atmosphere, and an independent operator operated part connected with said auxiliary valve mechanism.

2. The combination with a main and auxiliary power actuator, each comprising a cylinder and a piston therein provided with means for connecting it with a part to be operated, controlling valve mechanism for the main actuator, means for connecting the main actuator cylinder with a source of suction and with a source of higher pressure fluid under the control of said valve mechanism, means for holding the valve mechanism in position to normally maintain said piston submerged in air at atmospheric pressure when in retracted position, tubular connections extending between said actuators forward of the pistons therein to permit said valve mechanism to effect the joint operation of both actuators, and a main operator operated device connected with said controlling valve mechanism, of an auxiliary controlling valve mechanism located in the pipe connection between said actuators and provided with a normally closed port in communication with the source of suction independently of the main actuator valve mechanism, said auxiliary controlling valve mechanism being constructed to normally maintain the actuator cylinders connected for joint operation in one position of said auxiliary valve mechanism, to disconnect them in another position of said auxiliary valve mechanism to permit the independent operation of the main actuator under the control of its valve mechanism, and in a third position of said auxiliary valve mechanism to connect the auxiliary actuator with said suction port to effect the operation of the auxiliary actuator without operating the main actuator, means for connecting the auxiliary actuator in rear of its piston with the atmosphere, and an independent operator operated part connected with said auxiliary valve mechanism.

3. In a brake system for automotive vehicles provided with an internal combustion engine having a suction passage, and independently operable brake mechanisms, the combination with a main actuator and an auxiliary actuator, each comprising a cylinder and a piston therein, connections from each piston to different brake mechanism, controlling valve mechanism for the main actuator, means for connecting said main actuator cylinder with said suction passage and with the atmosphere under the control of said valve mechanism, a main operator operated part connected with said valve mechanism, a normally open tubular connection extending from the main actuator cylinder forward of the piston therein to the auxiliary actuator cylinder forward of the piston therein, of an auxiliary controlling valve mechanism in said air connection connected with said suction passage independently of said main valve mechanism, and constructed to normally maintain said cylinders in communication, and to disconnect said cylinders, and to connect the portion of said tubular connection leading to the auxiliary actuator cylinder with said suction passage independently of the main actuator, means for connecting the auxiliary actuator in rear of its piston with the atmosphere, and an auxiliary operator operated part connected with said auxiliary controlling valve mechanism.

4. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanism, controlling valve mechanism for the main actuator, means for connecting said main actuator cylinder with said suction passage and with the atmosphere under the control of said valve mechanism, a main operator operated part connected with said valve mechanism, and a normally open tubular connection extending from the main actuator cylinder forward of the piston therein to the auxiliary actuator cylinder forward of the piston therein, of an auxiliary controlling valve in said tubular connection comprising a casing having ports communicating with said cylinders, and a separate suction port communicating with the suction passage of the engine independently of the main actuator, a movable valve in said valve casing, means for normally holding said valve in position to establish communication between said cylinders, and an auxiliary operator operated device connected with said valve for moving the valve into position to disconnect said cylinders in one position of the valve, and in another position of the valve to connect said suction port with the auxiliary actuator cylinder while maintaining the separation of said cylinders, and means for connecting the auxiliary actuator in rear of its piston with the atmosphere.

5. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanism, controlling valve mechanism for the main actuator, means for connecting said main actuator cylinder with said suction passage and with the atmosphere under the control of said valve mechanism, a main operator operated part connected with said valve mechanism, a normally open tubular connection extending from the main actuator cylinder forward of the piston therein to the auxiliary actuator cylinder forward of the piston therein, and means for holding the valve mechanism of the main actuator in position to normally maintain both pistons submerged in air at atmospheric pressure when the pistons are in retracted position, of an auxiliary controlling valve in said tubular connection having ports communicating with said cylinders and a separate suction port communicating with the suction passage of the engine independently of the main actuator, a movable valve in said casing, means for holding said valve normally in position to connect said cylinders, said valve being constructed to disconnect said cylinders in one position of the valve, and in another position of the valve to connect said suction port with the auxiliary actuator cylinder forward of its piston while maintaining the separation of said cylinder, and an auxiliary operator operated part connected with said auxiliary valve.

6. In brake mechanism for an automotive tractor vehicle provided with an internal combustion engine having a suction passage and brake mechanism for the tractor, and a trailer connected with and propelled by the tractor and provided with independently operable brake mechanism, the combination with a main actuator on the tractor comprising a cylinder and a piston connected with the brake mechanism thereof, an auxiliary actuator on the trailer, comprising a cylinder and a piston connected with the trailer brake mechanism, controlling valve mechanism for the main actuator, means for connecting the main actuator cylinder with said suction passage and with the atmosphere under the control of said valve mechanism, a main operator operated part on the tractor connected with said valve mechanism, a tubular connection extending between the portions of said cylinders forward of their respective pistons, and means for holding the valve mechanism in position to normally maintain the pistons of the main and auxiliary actuator submerged in air at atmospheric pressure when in retracted position, of an auxiliary valve mechanism on the tractor located in said tubular connection and connected with said suction passage independently of the main actuator, for normally maintaining said cylinders connected to permit of the operation of both actuators substantially simultaneously to apply the brakes of the tractor and trailer under the control of the main actuator valve mechanism, said auxiliary valve mechanism being constructed to disconnect said cylinders to permit the tractor brakes only to be operated in one position of said auxiliary valve mechanism, and in another position thereof to connect the auxiliary actuator cylinder forward of its piston with the suction passage while maintaining said cylinders disconnected to operate the trailer brake mechanism only, means for connecting the auxiliary actuator in rear of its piston with the atmosphere, and an auxiliary operator operated part on the tractor connected with said auxiliary valve mechanism.

7. In brake mechanism for a tractor vehicle provided with an internal combustion engine having a suction passage and brake mechanism, and a trailer connected with and propelled by the tractor and provided with independently operable brake mechanism, the combination with a main actuator carried by the tractor and an auxiliary actuator carried by the trailer, each comprising a cylinder and piston, connections from the piston of each actuator to the brake mechanism of the vehicle on which it is mounted, controlling valve mechanism for the main actuator, means for connecting said main actuator cylinder with said suction passage and with the atmosphere under the control of said valve mechanism, a main operator operated part on the tractor connected with said valve mechanism, tubular connections between said actuators, of an auxiliary controlling valve in said tubular connections, a tubular connection from said auxiliary valve mechanism to the suction passage of the engine independent of the main actuator, said auxiliary valve mechanism being provided with means for connecting said actuators in the normal position of said valve mechanism to permit the substantial simultaneous and equal operation of the tractor and trailer brake mechanism under the control of the valve mechanism for the main actuator, and in another position of the said auxiliary valve mechanism to disconnect said actuators to permit the operation of the tractor brake mechanism only, and in a third position of said valve mechanism to connect the auxiliary actuator through said independent connection with the suction passage while maintaining said cylinders disconnected, and thereby effecting the operation of the trailer brake mechanism without operating the tractor brake mechanism, and an auxiliary operator operated part on the tractor connected with said auxiliary valve mechanism.

8. In brake mechanism for a tractor vehicle provided with an internal combustion engine having a suction passage and brake mechanism, and a trailer connected with and propelled by the tractor and provided with independently operable brake mechanism, the combination with a main actuator carried by the tractor and an auxiliary actuator carried by the trailer, each comprising a cylinder and piston, connections from the piston of each actuator to the brake mechanism of the vehicle on which it is mounted, controlling valve mechanism for the main actuator, means for connecting said main actuator cylinder with said suction passage and with the atmosphere under the control of said valve mechanism, a main operator operated part on the tractor connected with said valve mechanism, tubular connections between said actuators, of an auxiliary controlling valve in said tubular connections, a connection from said auxiliary valve mechanism to the suction passage of the engine independent of the main actuator, said auxiliary valve mechanism being constructed to normally connect said actuators to permit the substantial simultaneous and equal operation of the tractor and trailer brake mechanism under the control of the valve mechanism for the main actuator, and in another position of the auxiliary valve mechanism to disconnect said actuators to permit the operation of the tractor brake mechanism only, and in a third position of said auxiliary valve mechanism to connect the auxiliary actuator with said independent connection with the suction passage while maintaining said cylinders disconnected, to effect the operation of the trailer brake mechanism without operating the tractor brake mechanism, an auxiliary operator operated part on the tractor connected with said auxiliary valve mechanism, the main operator operated part being connected with the tractor brake mechanism by means permitting lost motion to enable the operator to add his physical force to the tractor brake mechanism, and to operate the tractor brake mechanism in case of failure of power.

9. In brake mechanism for a tractor vehicle provided with an internal combustion engine having a suction passage and brake mechanism, and a trailer connected with and propelled by the tractor and provided with independently operable brake mechanism, the combination with a main actuator carried by the tractor and an auxiliary actuator carried by the trailer, each comprising a cylinder and piston, connections from the piston of each actuator to the brake mechanism of the vehicle on which it is mounted, controlling valve mechanism for the main actuator, means for connecting said main actuator cylinder with said suction passage and with the atmosphere under the control of said valve mechanism, a main operator operated part on the tractor connected with said valve mechanism, tubular connections between said actuators, of an auxiliary controlling valve mechanism in said tubular connections, a tubular connection from said auxiliary valve mechanism to the suction passage of the engine independent of the main actuator, said auxiliary valve mechanism being constructed to normally connect said actuators to permit the substantial simultaneous and equal operation of the tractor and trailer brake mechanisms under the control of the valve mechanism for the main actuator, and in another position of the auxiliary valve mechanism to disconnect said actuators to permit the operation of the tractor brake mechanism only, and in a third position of said auxiliary valve mechanism to connect the auxiliary actuator through said independent connection with the suction passage while maintaining said cylinders disconnected, to effect the operation of the trailer brake mechanism without operating the tractor brake mechanism, an auxiliary operator operated part on the tractor connected with said auxiliary valve mechanism, retracting means for said auxiliary valve mechanism normally holding it in position to connect said actuator cylinders and close said independent suction connection, and means for locking the auxiliary valve mechanism in its intermediate position in which said actuator cylinders are disconnected to permit of continued use of the tractor brake mechanism alone, without operating the trailer brake mechanism.

10. In brake mechanism for a tractor vehicle provided with an internal combustion engine having a suction passage and brake mechanism, and a trailer connected with and propelled by the tractor and provided with independently operable brake mechanism, the combination with a main actuator carried by the tractor, and an auxiliary actuator carried by the trailer, each comprising a cylinder closed at its forward end, and a piston in said cylinder, each of said actuator cylinders having its rear end in communication with the atmosphere at all times, connections from the piston of each actuator to the brake mechanism of the vehicle on which it is mounted, controlling valve mechanism for the main actuator, means for connecting the main actuator cylinder forward of its piston with the suction passage of the engine and with the atmosphere under the control of said valve mechanism to apply and release the tractor brake mechanism, a main operator operated part on the tractor connected with said valve mechanism, a tubular connection connecting said cylinders forward of their respective pistons, of an auxiliary controlling valve mechanism in said tubular connection, operatively connected with the suction passage of the engine independently of the main actuator, said auxiliary valve mechanism being constructed to normally connect said actuator cylinders forward of their pistons to permit the substantial simultaneous and equal operation of the tractor and trailer brake mechanisms under the control of the valve mechanism for the main actuator, and in another position of the auxiliary valve mechanism to disconnect said actuator cylinders to permit the operation of the tractor brake mechanism only, under the control of its valve mechanism, and in a third position of said auxiliary valve mechanism to connect the auxiliary actuator forward of its piston with the suction passage while maintaining said cylinders disconnected to effect the operation of the trailer brake mechanism independently of the tractor brake mechanism, an auxiliary operator operated part on the tractor operatively connected with said auxiliary valve mechanism, means for holding the auxiliary valve mechanism in its normal position and in its intermediate position when moved thereto, and operative connections between the main operator operated part and the main actuator piston including a provision for lost motion sufficient to insure the operation of the main actuator valve mechanism.

In testimony whereof we affix our signatures.

CALEB S. BRAGG.
VICTOR W. KLIESRATH.